United States Patent
Huang

(10) Patent No.: US 12,346,007 B2
(45) Date of Patent: Jul. 1, 2025

(54) UNDERWATER OBSERVATION DEVICE

(71) Applicant: NATIONAL SUN YAT-SEN UNIVERSITY, Kaohsiung (TW)

(72) Inventor: Ing-Jer Huang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 41 days.

(21) Appl. No.: 18/154,877

(22) Filed: Jan. 16, 2023

(65) Prior Publication Data

US 2023/0229063 A1    Jul. 20, 2023

(30) Foreign Application Priority Data

Jan. 20, 2022 (TW) ................................ 111200821
Sep. 21, 2022 (CN) .......................... 202222787565.1

(51) Int. Cl.
| | |
|---|---|
| *G03B 17/08* | (2021.01) |
| *H04N 23/20* | (2023.01) |
| *H04N 23/51* | (2023.01) |
| *H04N 23/52* | (2023.01) |

(52) U.S. Cl.
CPC ............. *G03B 17/08* (2013.01); *H04N 23/20* (2023.01); *H04N 23/51* (2023.01); *H04N 23/52* (2023.01)

(58) Field of Classification Search
None
See application file for complete search history.

(56) References Cited

U.S. PATENT DOCUMENTS

| | | | | |
|---|---|---|---|---|
| 3,838,434 | A | * | 9/1974 | Hughes ................. G03B 17/08 396/27 |
| 5,701,518 | A | * | 12/1997 | Honda ................... G03B 17/08 396/29 |
| 6,784,920 | B2 | | 8/2004 | Weber |
| 2010/0139130 | A1 | * | 6/2010 | Wagenaar ............. B63G 8/001 37/342 |
| 2012/0133758 | A1 | * | 5/2012 | Foss ....................... G03B 17/08 348/81 |
| 2015/0002621 | A1 | * | 1/2015 | Ratner ................. H04N 23/698 348/36 |
| 2015/0191927 | A1 | * | 7/2015 | Tavor .................... E04H 4/1654 15/1.7 |
| 2016/0173741 | A1 | * | 6/2016 | Wolfenbarger ........ G03B 17/08 348/81 |

(Continued)

FOREIGN PATENT DOCUMENTS

| | | |
|---|---|---|
| CN | 210578942 U | 5/2020 |
| TW | M572641 U | 1/2019 |

(Continued)

*Primary Examiner* — Chikaodili E Anyikire
(74) *Attorney, Agent, or Firm* — CKC & Partners Co., LLC

(57) ABSTRACT

An underwater observation device is proposed. The underwater observation device includes a case body having an inner space. The case body includes a first filtering portion, a first transparent portion, and a second transparent portion. The first filtering portion is configured to filter impurities in the water entering the case body. The first transparent portion and the second transparent portion are adjacent to the first filtering portion and are located on two opposite sides of the case body respectively. The first transparent portion and the second transparent portion are configured for a user to observe at least one object through the case body.

14 Claims, 7 Drawing Sheets

(56) References Cited

U.S. PATENT DOCUMENTS

| | | | | | |
|---|---|---|---|---|---|
| 2018/0217029 | A1* | 8/2018 | Billings | ................... | G01N 1/14 |
| 2019/0004401 | A1* | 1/2019 | Wilson | ................... | F16M 13/02 |
| 2019/0106897 | A1* | 4/2019 | Ben Dov | .............. | E04H 4/1654 |
| 2020/0124943 | A1* | 4/2020 | Eagle | ..................... | G03B 17/12 |
| 2020/0321810 | A1* | 10/2020 | Okamoto | .............. | H02J 50/005 |
| 2020/0358931 | A1* | 11/2020 | Jenkinson | .............. | G03B 17/08 |
| 2021/0094660 | A1* | 4/2021 | Claus | ..................... | B63B 79/10 |
| 2021/0392254 | A1* | 12/2021 | Andersson | ............. | A01G 23/08 |

FOREIGN PATENT DOCUMENTS

| | | |
|---|---|---|
| TW | M577655 U | 5/2019 |
| TW | I707584 B | 10/2020 |

* cited by examiner

UNDERWATER OBSERVATION DEVICE

RELATED APPLICATIONS

This application claims priority to Taiwan Application Serial Number 111200821, filed Jan. 20, 2022 and China Application Serial Number 202222787565.1, filed Sep. 21, 2022, which are herein incorporated by reference.

BACKGROUND

Field of Invention

The present disclosure relates to an observation apparatus, and more particularly, to an underwater observation device.

Description of Related Art

Common underwater observation apparatuses, such as camera and video camera, when used in aquaculture farm environment, may be influenced by impurities carried by water flow, such as residual baits, biological excreta, floating dirt, etc., which influences the imaging of the object to be observed.

Some other underwater observation apparatuses make the video camera conduct observation through a case body containing air or clear water such that the video camera is not influenced by the water flow or water quality. However, the disadvantage of using the case body containing air is that an extra plumb is required for the sinking of the case body. Furthermore, the pressure difference between the inside and the outside of the case body is also easy to deform or even damage the case body. Additionally, if the case body containing clear water is used, it takes additional effort to transport and setup the case body, and thus is extremely inconvenient for the observation work. Therefore, there is a need for an underwater observation device that can address the aforementioned problems.

SUMMARY

In view of this, an objective of the present disclosure is to provide an underwater observation device which is equipped with a filtering portion capable of filtering out impurities in the fluid (such as water) entering the case body by using different filter mechanisms, such that an observation assembly (such as a video camera device) can observe an object in a limpid environment, thereby improving the observation quality and the photography conditions.

Another objective of the present disclosure is to provide an underwater observation device which uses additional holes and/or tubes to exhaust the gas in the case body smoothly when the case body enters the water, such that the sinking speed of the case body is increased so as to conduct the observation easily and rapidly. Moreover, the limpid fluid such as gas or liquid may be injected into the case body through the holes and the tubes.

Still another objective of the present disclosure is to provide an underwater observation device which uses an induction device to attract the objects to be observed such that users and/or observation assemblies may easily focus on the objects for observation, thereby increasing the efficiency of the observation.

According to the aforementioned objectives of the present disclosure, an underwater observation device is proposed. The underwater observation device includes a case body and a first filtering portion. The case body has an inner space. The case body includes a first transparent portion. The first transparent portion is located on a side of the case body, in which at least one object is suitable to be located on the first transparent portion, and the at least one object is observed through the first transparent portion. The first filtering portion is connected to the case body and is configured to filter a plurality of impurities in a fluid entering the case body.

In accordance with one embodiment of the present disclosure, the case body further includes a second transparent portion, the first transparent portion and the second transparent portion are adjacent to the first filtering portion and are respectively located on two opposite sides of the case body, wherein the first transparent portion and the second transparent portion are configured for a user to observe the at least one object through the case body.

In accordance with one embodiment of the present disclosure, the case body is a cylinder or a hexahedron.

In accordance with one embodiment of the present disclosure, the underwater observation device further includes at least one hole. The at least one hole passes through the case body and configured for the fluid to enter and exit the case body.

In accordance with one embodiment of the present disclosure, the underwater observation device further includes at least one tubes. The tube is connected to the case body through the at least one hole.

In accordance with one embodiment of the present disclosure, a number of at least one tube is two, the tubes are connected to the case body, and the first filtering portion is disposed in one of the tubes.

In accordance with one embodiment of the present disclosure, the case body further includes a first observation assembly. The first observation assembly is disposed on the second transparent portion and is configured to observe the at least one object on the first transparent portion through the second transparent portion and the first transparent portion, in which the first observation assembly is connected to the second transparent portion and located at outside the inner space.

In accordance with one embodiment of the present disclosure, the underwater observation device further includes an induction assembly. The induction assembly is disposed on the first transparent portion, and the induction assembly is configured to attract the at least one object.

In accordance with one embodiment of the present disclosure, the first filtering portion includes a fixing assembly and a filtering material, and the fixing assembly is configured to fix the filtering material to the case body.

In accordance with one embodiment of the present disclosure, the first filtering portion includes a filtering material.

In accordance with one embodiment of the present disclosure, the underwater observation device further includes a first observation assembly. The first observation assembly is disposed in the inner space and is configured to observe the at least one object on the first transparent portion through the first transparent portion.

In accordance with one embodiment of the present disclosure, the underwater observation device further includes a first observation assembly, in which the case body has a mounting hole, the mounting hole is communicated with the inner space, and the first observation assembly is inserted in the mounting hole, and a portion of the first observation assembly is located in the inner space.

In accordance with one embodiment of the present disclosure, the underwater observation device further includes a video camera device and a protecting cover. The protecting cover covers and seals the video camera device.

In accordance with one embodiment of the present disclosure, the video camera device is an infrared video camera device, and an infrared light is able to pass through the first transparent portion.

According to the aforementioned objectives of the present disclosure, an underwater observation device is also proposed. The underwater observation device includes a case body, a first filtering portion, and a first observation assembly. The case body has an inner space and includes a first transparent portion. The first transparent portion is located on a side of the case body, in which at least one object is suitable to be located on the first transparent portion. The first filtering portion is connected to the case body and is configured to filter plural impurities in a fluid entering the case body. The first observation assembly is configured to observe the at least one object on the first transparent portion through the first transparent portion.

In accordance with one embodiment of the present disclosure, the first observation assembly includes a video camera device and a protecting cover. The protecting cover covers and seals the video camera device.

BRIEF DESCRIPTION OF THE DRAWINGS

The objectives, features, advantages, and embodiments of the present disclosure are best understood when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure are discussed in detail in the following. However, it is understood that the embodiments provides various applicable concepts which can be implemented in a variety of specific contents. The discussed and disclosed embodiments are merely illustrative, but are not used to limit the scope of the present disclosure. All the embodiments of the present disclosure disclose many different features, and these features can be implemented alone or in combination based on requirements.

In addition, terms "first", "second", etc. used herein do not indicate sequence or order particularly, and are merely for distinguishing elements or operations described with same technical term.

A common problem with underwater observation devices is that fluid turbidity affects the observation. For example, poor water quality, especially in flowing waters, where contaminants or impurities in the water may drift with the current, thereby influencing the visibility of the observation. Accordingly, the present disclosure proposes an underwater observation device with filtering mechanism, particularly suitable for aquaculture farm waters. The residual baits and excreta in aquaculture farm waters can be isolated outside the observation device through active and passive filtering mechanisms so that a clear view can be kept in the observation device and is not influenced by the water flow. On the other hand, it is also helpful to reduce the pressure difference between the inside and the outside of the case body, so as to lower the possibility of deformation or even breakage of the case body.

Figure 1:
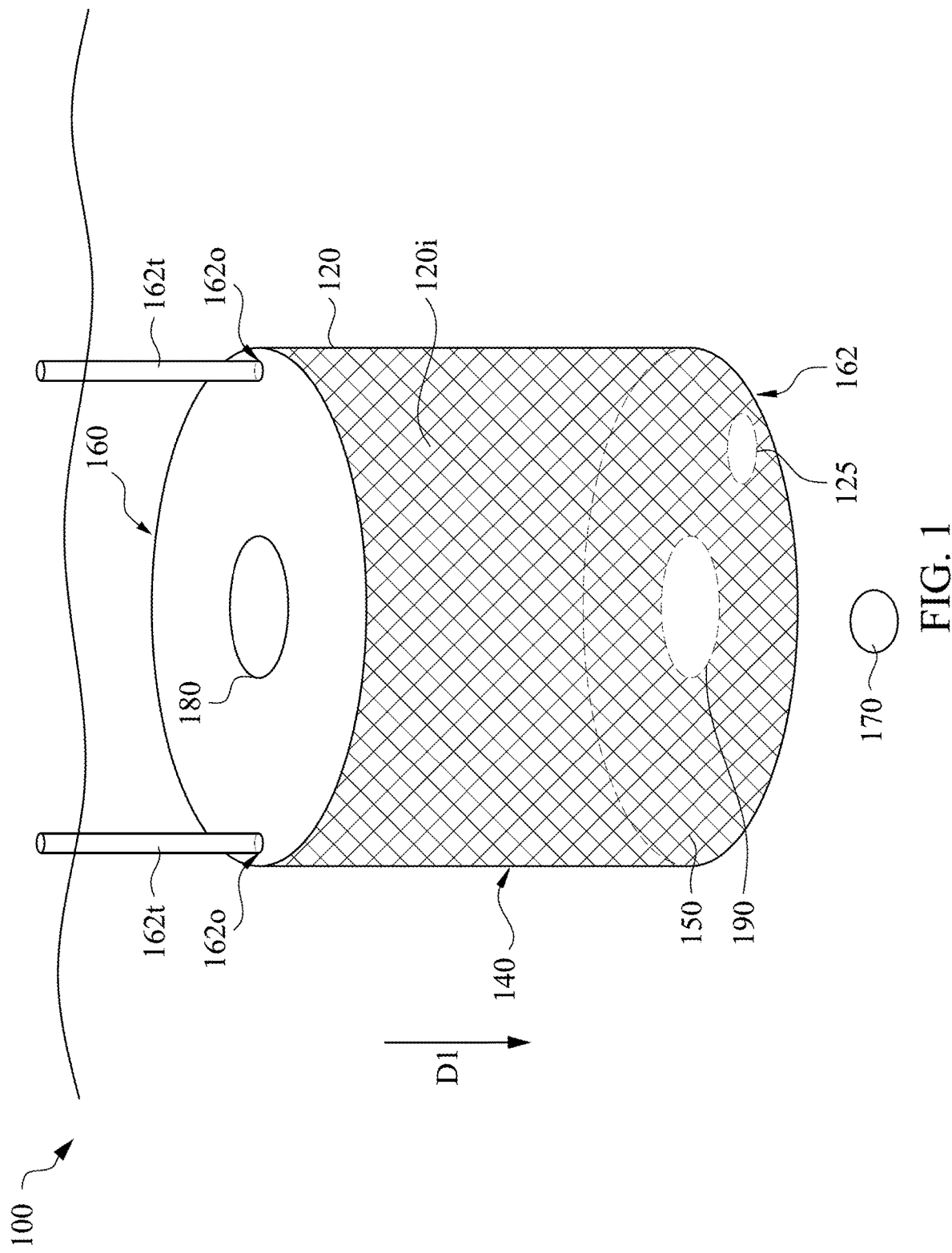
FIG. 1 illustrates a schematic view of an underwater observation device in accordance with one embodiment of the present disclosure.

Referring to FIG. 1, FIG. 1 illustrates a schematic view of an underwater observation device in accordance with one embodiment of the present disclosure. In the present embodiment, an underwater observation device 100 may mainly include a case body 120 as its main body. In the example shown in FIG. 1, the case body 120 is a cylinder; however, in other embodiments, the case body 120 may be any suitable shape. For example, the case body 120 may be a tetrahedron, a hexahedron, an octahedron, etc. As shown in FIG. 1, the case body 120 may have an inner space 120*i*, i.e., the case body 120 may be a hollow structure, and its inner portion can accommodate fluids. For example, when the underwater observation device 100 is pressed into the water, the water may enter the inner space 120*i* of the case body 120.

In some exemplary examples, the underwater observation device 100 may further include a first filtering portion 140. In the example shown in FIG. 1, the first filtering portion 140 is connected to the case body 120, in which the first filtering portion 140 may be located on the sidewall of the cylinder shown in FIG. 1. The first filtering portion 140 may be used to filter impurities in the fluid (for example, water) entering the case body 120. Specifically, when the water with impurities, such as dirt, residual baits, or biological excreta in aquaculture farm waters, enters the inner space 120*i* from the outside of the case body 120, the first filtering portion 140 may block these impurities outside the underwater observation device 100, such that the environment in the case body 120 is more clear and transparent compared to that of the outside of the case body 120 and is not influenced by the flow of water. In some embodiments, the first filtering portion 140 may include a filtering material 150. For example, the filtering material 150 may be spread and disposed on the sidewall portion of the case body 120 by some fixing assemblies (not shown), such that the filtering material 150 surrounds the case body 120 to substantially form the shape of the sidewall portion of the cylinder. The filtering material 150 may be any suitable reticulation and may filter the impurities in the water.

Figure 2:
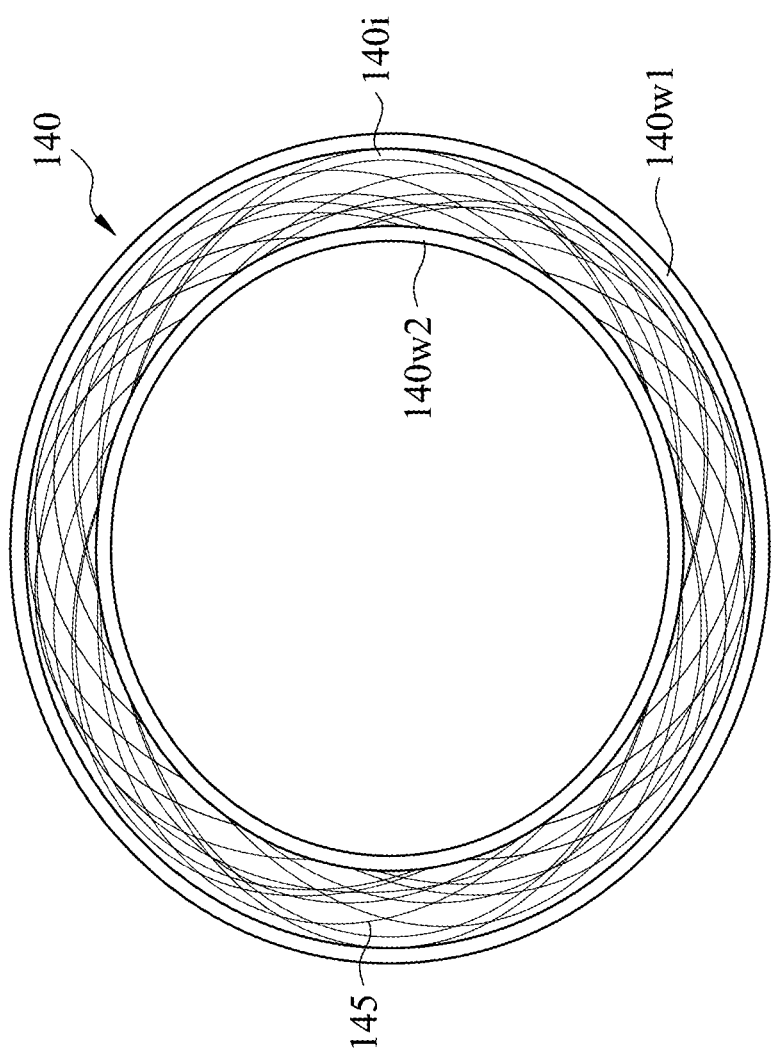
FIG. 2 illustrates a top view of a first filtering portion of the underwater observation device in accordance with one embodiment of the present disclosure.

In some other examples, the first filtering portion 140 may include an accommodation space and a filtering material, which may be placed in the accommodation space. Referring to FIG. 2, FIG. 2 illustrates a top view of the first filtering portion of the underwater observation device in accordance with one embodiment of the present disclosure. In the example shown in FIG. 2, the first filtering portion 140 may include an accommodation space 140i and a filtering material 145, and the accommodation space 140i may be used for accommodating the filtering material 145. In some examples, the first filtering portion 140 may have an outer side portion 140w1 and an inner side portion 140w2, and the accommodation space 140i is defined by the outer side portion 140w1 and the inner side portion 140w2. In some exemplary examples, the outer side portion 140w1 and the inner side portion 140w2 may be sidewalls including a plurality of openings (not shown) so that the accommodation space 140i may be formed between the outer side portion 140w1 and the inner side portion 140w2. The filtering material 145 may be filled in the accommodation space 140i. In this way, water flow may flow into the accommodation space 140i of the first filtering portion 140 from the outside of the case body 120 through the openings of the outer side portion 140w1, is filtered by the filtering material 145 therein, and enters the inner space 120i through the openings of the inner side portion 140w2.

In the present embodiment, the case body 120 may include a first transparent portion 162 and a second transparent portion 160. The second transparent portion 160 and the first transparent portion 162 are located on two opposite sides of the case body 120 respectively, that is, the first transparent portion 162 is located on one side of the case body 120, the second transparent portion 160 is located to another side of the case body 120, and the second transparent portion 160 and the first transparent portion 162 are adjacent to the first filtering portion 140. In other words, as shown in FIG. 1, the second transparent portion 160 and the first transparent portion 162 are two circular end portions of the cylindrical case body 120 respectively and are connected to the first filtering portion 140. The second transparent portion 160 and the first transparent portion 162 may be configured for a user to observe at least one object 170 through the case body 120, for example, aquatic organisms such as fish and shrimp.

It is worth noting that, in the embodiment as shown in FIG. 1, the first transparent portion 162 and the second transparent portion 160 are located on an upper end portion and a lower end portion of the cylindrical case body 120. However, in other embodiments, the first transparent portion 162 and the second transparent portion 160 may also be located on a front side and a back side or a left side and a right side of the hexahedral case body 120. Accordingly, the first transparent portion 162 and the second transparent portion 160 are not limited to be located on the upper end portion and the lower end portion of the case body 120.

For example, the object 170 is suitable to be located adjacent to the first transparent portion 162, and the user may observe the object 170 from the second transparent portion 160 through the clear environment in the inner space 120i of the case body 120 toward the first transparent portion 162. In some other cases, the user may observe the object 170 from the first transparent portion 162 toward the second transparent portion 160 when the object 170 is near the second transparent portion 160. In some examples, the second transparent portion 160 and the first transparent portion 162 may be formed of any suitable transparent material, such as polymethyl methacrylate (PMMA) or glass, for observation.

In some examples, the case body 120 of the underwater observation device 100 may further include at least one hole 162o. For example, the holes 162o may pass through the second transparent portion 160 of the case body 120, and may enable the fluid (for example, water) to enter and exit the case body 120. For example, when the case body 120 enters the water, the holes 162o may help the gas in the inner space 120i of the case body 120 to be exhausted due to the pressure, that is, the hole 162o may be provided for discharging fluid (such as gas) from the case body 120. In such example, when the inner space 120i of the case body 120 is filled with clear water filtered by the first filtering portion 140, plugs (not shown) corresponding to the shapes and sizes of the holes 162o may be used to plug the holes 162o to block the passages through the holes 162o from the waters outside the case body 120 to the inner space 120i. In this way, after the inner space 120i is filled with clear water, water flow with impurities or dirt, which is not filtered by the first filtering portion 140, may be prevented from entering the inner space 120i through the holes 162o to influence the limpidity of the environment in the case body 120.

In some other examples, the case body 120 may further include tubes 162t. For example, the tubes 162t may be fluidly connected to the inner space 120i of the case body 120 so that the gas in the inner space 120i may be further exhausted by the tubes 162t through the holes 162o. With the tubes 162t, the sinking of the case body 120 may be smoother, thereby accelerating the observation work. In such example, the ends of the tubes 162t which are opposite to the ends connected to the holes 162o must be kept above the water surface to prevent the water with dirt from entering the inner space 120i of the case body 120 through the tubes 162t. In addition, the tubes 162t may be further used to reduce the time for filling the inner space 120i of the case body 120 with clear water. For example, when the case body 120 enters the water, a pumping device (not shown) may also be used to pump clear water into the case body 120 in addition to waiting for water flow entering the inner space 120i from the waters outside the case body 120 through the first filtering portion 140. In this way, the time for filling the inner space 120i with clear water is reduced and the time for setting the underwater observation device is reduced effectively, thereby accelerating the observation work. It is noted that the aforementioned holes and/or tubes may also be disposed through the first transparent portion 162, or the second transparent portion 160 and the first transparent portion 162 may have holes and/or tubes to make the sinking of the case body 120 easier. The position and number of the aforementioned holes and/or tubes are not limited to that shown in FIG. 1, and may be any suitable position and number. In addition, the dimensions of the aforementioned holes and/or tubes, such as sizes or lengths, may be adjusted based on practical exhaust requirements.

In some examples, the underwater observation device 100 may further include a first observation assembly 180. In some exemplary examples, the first observation assembly 180 may be fixed to and be connected to the second transparent portion 160, and may be located outside the inner space 120i, and the first observation assembly 180 and the first transparent portion 162 are located on two opposite sides of the second transparent portion 160 respectively. In this way, the first observation assembly 180 may be used to observe the object 170 through the second transparent portion 160 and the first transparent portion 162. In other words, as shown in FIG. 1, the first observation assembly 180 may observe the object 170 on the first transparent portion 162 along a direction D1. In other examples, the first observation assembly 180 may be fixed to the first transparent portion 162, and the first observation assembly 180 and the second transparent portion 160 are located on two opposite sides of the first transparent portion 162 respectively. In this way, the observation may be conducted along a direction opposite to the direction D1 through the first transparent portion 162 and the second transparent portion 160.

In some other examples, the first observation assembly 180 may also be disposed through the second transparent portion 160. For example, the second transparent portion 160 may have a recessed space (not shown) extending into the inner space 120i of the case body 120. The recessed space may accommodate the first observation assembly 180 such that the first observation assembly 180 may be partially or fully located in the case body 120.

In some examples, the first observation assembly 180 may be video camera, camera, etc., in which the first observation assembly 180 may be a visible video camera or an infrared video camera. In some other examples, the first observation assembly 180 may be any suitable observation device. In some examples, the first observation assembly 180 may be connected to a display device with wired connection for real time observation of the object 170. In some other examples, the first observation assembly 180 may also be connected to the display device with wireless connection.

The first observation assembly 180 may be the infrared video camera, such that the first transparent portion 162 and the second transparent portion 160 may be opaque in appearance but be transparent to the infrared light, that is, both the first transparent portion 162 and the second transparent portion 160 may have relatively low visible transmittance and relatively high infrared transmittance. In other words, the first transparent portion 162 and the second transparent portion 160 may allow infrared light to pass through, and may block the visible light.

In some examples, the underwater observation device 100 may further include an induction assembly 190. For example, the induction assembly 190 may be disposed on the first transparent portion 162. In some exemplary examples, the first transparent portion 162 may have a recessed structure (not shown) for setting the induction assembly 190. The induction assembly 190 may attract the object 170 so that the user and/or the observation assembly may easily observe the object 170. In some examples, the induction assembly 190 may be bait, feed, etc. In some other examples, the induction assembly 190 may be any suitable induction device, such as a device capable of emitting specific frequency, a device capable of emitting light with specific wavelength, etc., for attracting the object 170. In such examples, the induction assembly 190 may be connected to a controller (not shown) with wired or wireless connection so that the operation of the induction assembly 190 may be controlled effectively. The ways of setting the aforementioned first observation assembly 180 and induction assembly 190 are not limited to that shown in FIG. 1, and may be any suitable way, for example, the first observation assembly 180 may be disposed on the first transparent portion 162 and the induction assembly 190 may be disposed on the second transparent portion 160.

In some examples, the case body 120 may further include one or more holes 125. In the embodiment shown in FIG. 1, a hole 125 may be disposed on the first transparent portion 162. A plug (not shown) may be used to plug the hole 125, when the case body 120 enters the water, to prevent water flow with dirt from entering the inner space 120i through the hole 125. The hole 125 may be used to accelerate the velocity for moving out the case body 120 from the water. For example, when the filtering material 150 of the first filtering portion 140 is to be changed or the case body 120 is to be cleaned, the case body 120 needs to be moved out from the water. At this time, because of the inner space 120i of the case body 120 filled with water and the weight of the case body 120, it takes much more strength and time for moving out the case body 120 from the water. In this case, when the case body 120 is to be moved out from the water, the plug plugged in the hole 125 may be removed first, and then the case body 120 may be moved out from the water. In this way, during the process of moving the case body 120 out from the water, the water in the inner space 120i may flow out not only through the first filtering portion 140 but also through the hole 125, thereby accelerating moving out the case body 120 from the water.

Figure 3:
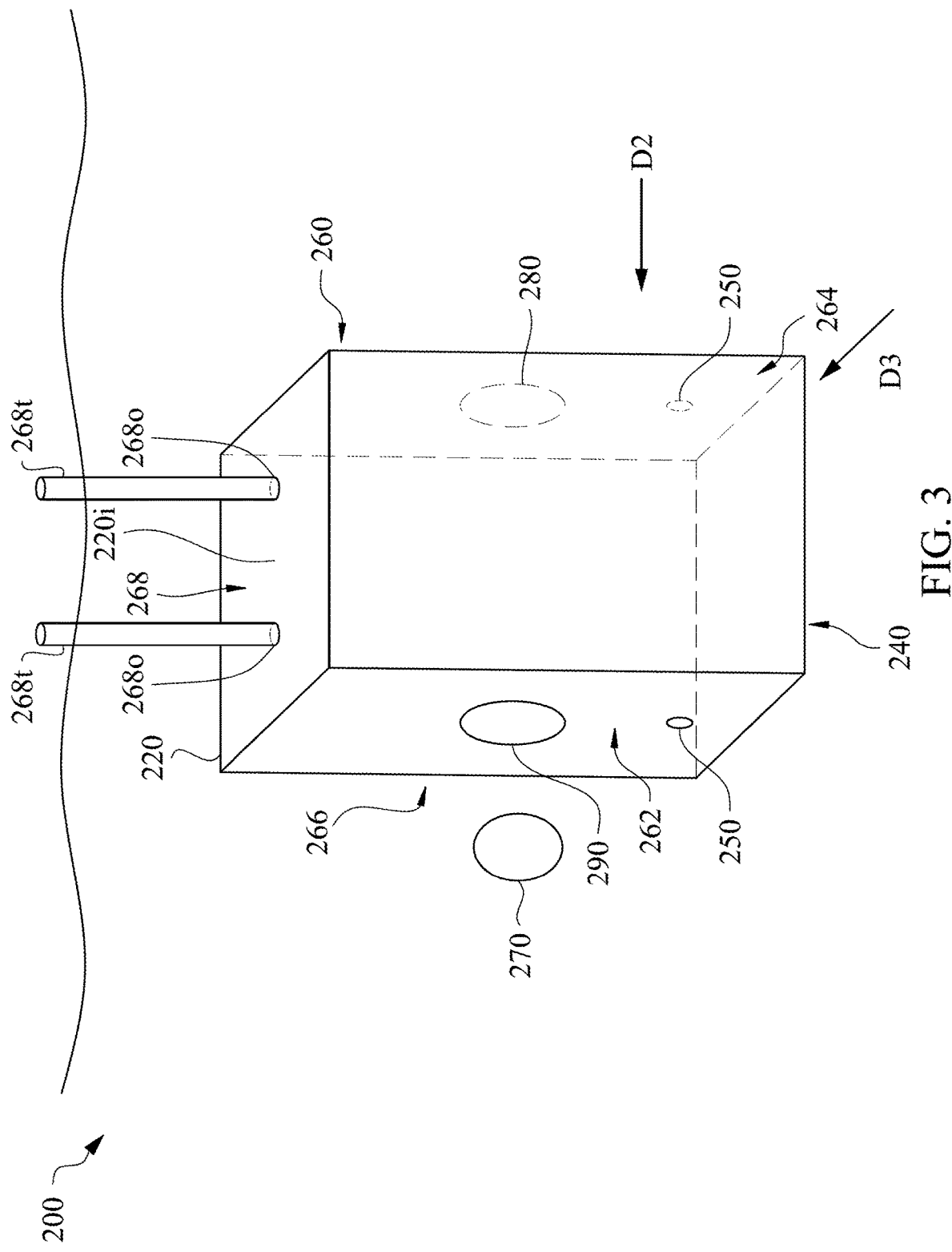
FIG. 3 illustrates a schematic view of an underwater observation device in accordance with another embodiment of the present disclosure.

In another embodiment, the case body of the underwater observation device may also be other shapes. Referring to FIG. 3, FIG. 3 illustrates a schematic view of an underwater observation device in accordance with another embodiment of the present disclosure. Similar to the underwater observation device 100, in the present embodiment, an underwater observation device 200 may mainly include a case body 220 of a hexahedral shape. As shown in FIG. 3, the case body 220 also includes a first filtering portion 240. The first filtering portion 240 may be similar to the first filtering portion 140 described with reference to FIG. 1 and FIG. 2, and is not repeated herein.

In the present embodiment, the case body 220 further includes a third transparent portion 264, a fourth transparent portion 266, and a fifth transparent portion 268 in addition to a second transparent portion 260 and a first transparent portion 262. The third transparent portion 264 and the fourth transparent portion 266 are located on two opposite sides of the case body 220 and are adjacent to the first filtering portion 240. In other words, in the present embodiment, the second transparent portion 260 and the first transparent portion 262, and the third transparent portion 264 and the fourth transparent portion 266 may be two sets of sidewall portions of the case body 220, and the fifth transparent portion 268 is the side opposite to the first filtering portion 240. The materials and characteristics of the third transparent portion 264, the fourth transparent portion 266, and the fifth transparent portion 268 may be similar to the second transparent portion 260 and the first transparent portion 262, and are not repeated herein.

In addition, in the example shown in FIG. 3, the underwater observation device 200 may further include holes 268o and/or tubes 268t. In an exemplary example, the holes 268o and/or the tube 268t may be disposed through the fifth transparent portion 268. Specifically, when the case body 220 enters the water with the first filtering portion 240, i.e. when the first filtering portion 240 is pressed toward the water surface, the gas in the case body 220 may be exhausted through the holes 268o and/or tubes 268t on the fifth transparent portion 268, which is opposite to the first filtering portion 240, to make the sinking of the underwater observation device 200 smoother. After the case body 220 is filled with clear water, plugs (not shown) are used to plug the holes 268o to prevent the water that is not filtered by the first filtering portion 240 from entering an inner space 220i through the holes 268o. In the case that the case body 220 includes the tubes 268t, when the case body 220 enters the water, ends of the tubes 268t which are opposite to the ends connected to the holes 268o need to be located above the water surface to prevent the water which is not filtered from entering the inner space 220i of the case body 220. In such example, a pumping device (not shown) may also be used to inject clear water to the inner space 220i through the tubes 268t to reduce the time for filling the case body 220 with clear water. It is noted that the holes 268o and/or the tubes 268t may also be disposed on the second transparent portion 260, the first transparent portion 262, the third transparent portion 264, and/or the fourth transparent portion 266, similar to the holes 162o and/or tubes 162t described with respect to FIG. 1. In some other examples, the fifth transparent portion 268 may also be replaced with a second filtering portion which is similar to the first filtering portion 240 to improve the ability of filtering when the case body 220 enters the water to make the water entering the inner space 220i more clearly.

In the embodiment shown in FIG. 3, a first observation assembly 280 may be fixed to the second transparent portion 260, and the first observation assembly 280 and the first transparent portion 262 are located on two opposite sides of the second transparent portion 260. In this way, the first observation assembly 280 may be used to observe an object 270 (for example, aquatic organisms such as fish and shrimp) through the second transparent portion 260 and the first transparent portion 262. In some other examples, the first observation assembly 280 may also disposed through the second transparent portion 260. In such examples, the second transparent portion 260 may have a space extending into the inner space 220i of the case body 220. The space may accommodate the first observation assembly 280 such that the first observation assembly 280 is partially or fully located in the case body 220.

In some examples, the underwater observation device 200 may also include an induction assembly 290. The induction assembly 290 may be similar to the induction assembly 190 described with reference to FIG. 1, and is not repeated herein. In the example shown in FIG. 3, the induction assembly 290 may be disposed on the first transparent portion 262 such that the first observation assembly 280 may observe the object 270 on the first transparent portion 262, i.e. the first observation assembly 280 may observe the object 270 on the first transparent portion 262 along a direction D2 through case body 220. In some other examples, the underwater observation device 200 may further include a second observation assembly (not shown). The second observation assembly may be fixed to the third transparent portion 264, and the second observation assembly and the fourth transparent portion 266 are located on two opposite sides of the third transparent portion 264. In this way, the observation may be conducted along a direction D3 through the third transparent portion 264 and the fourth transparent portion 266. The relative position of individual portions of the underwater observation device 200 described with respect to FIG. 3 may be adjusted based on practical requirements, but are not limited to the aforementioned description.

In some examples, the case body 220 may further include one or more holes 250. In the embodiment shown in FIG. 3, a hole 250 may be disposed on the second transparent portion 260, the first transparent portion 262, the third transparent portion 264, and/or the fourth transparent portion 266. When the case body 220 enters the water, a plug (not shown) may be first used to plug the hole 250 to prevent the water with dirt from entering the inner space 220i. The plug may be removed when the case body 220 is to be moved out from the water so that the water in the inner space 220i may also be discharged from the case body 220 through the hole 250 during the process of moving the case body 220 out from the water. In this way, the process of moving the case body 220 out from the water may be accelerated, and the strength needed may also be reduced.

Figure 4:
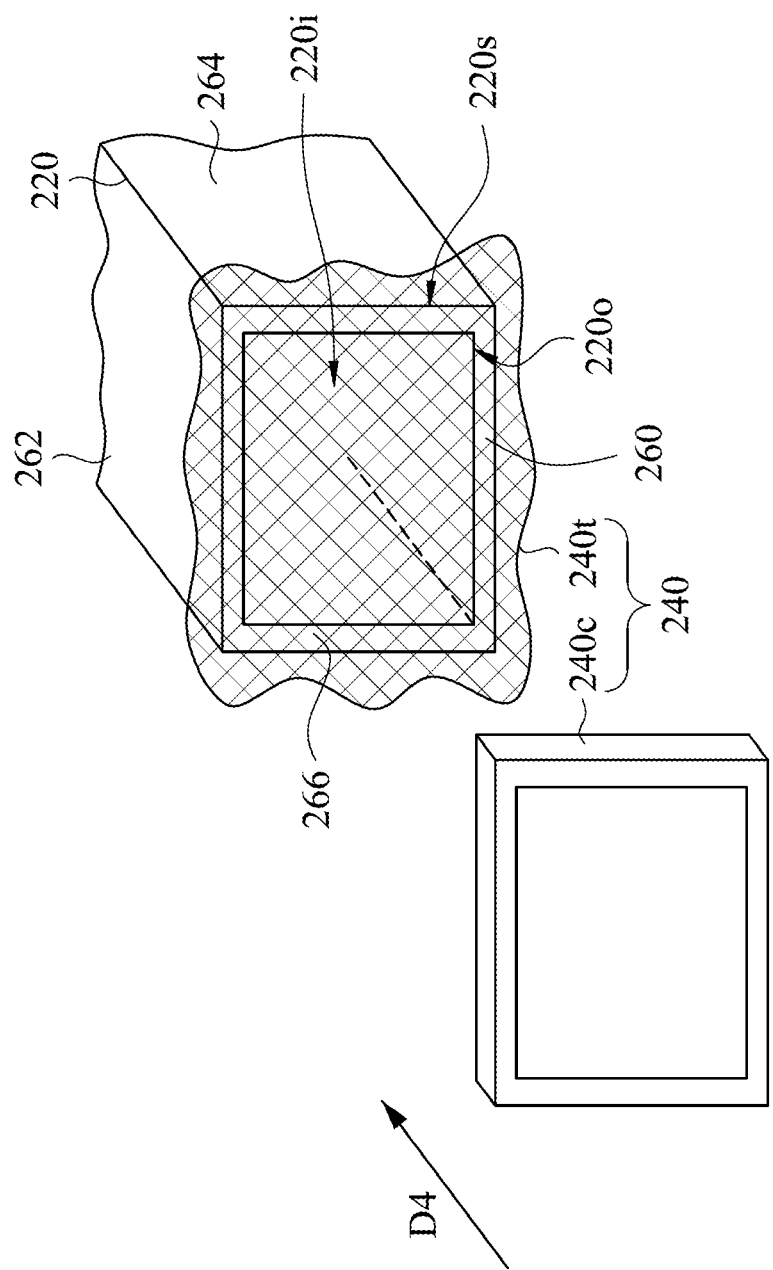
FIG. 4 illustrates a schematic view of assembling a first filtering portion of the underwater observation device in accordance with another embodiment of the present disclosure.

In some examples, in addition to the first filtering portion 140 described with reference to FIG. 1 and FIG. 2, the case body 220 of the present embodiment may further include other aspects of the first filtering portion 240. Referring to FIG. 4, FIG. 4 illustrates a schematic view of assembling a first filtering portion of the underwater observation device in accordance with another embodiment of the present disclosure. In the example shown in FIG. 4, the first filtering portion 240 is a filtering structure using a tight filtering material. In such example, an opening 220o having sidewalls 220s may be formed after the second transparent portion 260, the first transparent portion 262, the third transparent portion 264, and the fourth transparent portion 266 of the case body 220 are joined. The first filtering portion 240 may be disposed on the sidewalls 220s and covers the opening 220o.

In some examples, the first filtering portion 240 may include a fixing member 240c and a filtering material 240t. The filtering material 240t may be textile such as any suitable reticulation, and may filter impurities in the water. The fixing member 240c may be used to fix the filtering material 240t to the case body 120, for example, to the sidewalls 220s. In some exemplary examples, the fixing member 240c may be a frame structure, and a shape of the frame structure corresponds to that of the sidewalls 220s so that the fixing member 240c and the sidewalls 220s may be engaged with each other. In some exemplary examples, a dimension of the fixing member 240c may be slightly greater than that of the sidewalls 220s. In such examples, when assembled, the filtering material 240t may be first paved on the sidewalls 220s to cover the opening 220o, and then the fixing member 240c is disposed on the sidewalls 220s along a direction D4. The sidewalls 220s may be tightly embedded in the fixing member 240c so that the fixing member 240c and the sidewalls 220s may be joined by means of tight fit to tightly dispose the filtering material 240t on the whole opening 220o.

In some other examples, the dimension of the fixing member 240c may be slightly less than that of the sidewalls 220s. In such examples, the fixing member 240c may be engaged in the opening 220o and forms a tight fit with the opening 220o to tightly fix the filtering material 240t to the opening 220o. In still some examples, other ways of fixing, such as nails, may also be used to tightly fix the filtering material 240t to the sidewalls 220s.

With such design, the filtering material 240t may form a tight filtering structure on the opening 220o due to the force of the assembling of the fixing member 240c and sidewalls 220s. In this way, when the case body 220 enters the water, the filtering material 240t may not deform easily with the strike of the water flow, thereby maintaining a substantially planar state. As a result, without influencing the observation, the first filtering portion 240 may effectively filter impurities in the water entering the inner space 220i of the case body 220. Further, with the combined design of the fixing member 240c and the sidewalls 220s, the user may change different filtering material 240t for the first filtering portion 240 easily and rapidly based on requirements to increase the efficiency of the observation.

Figure 5:
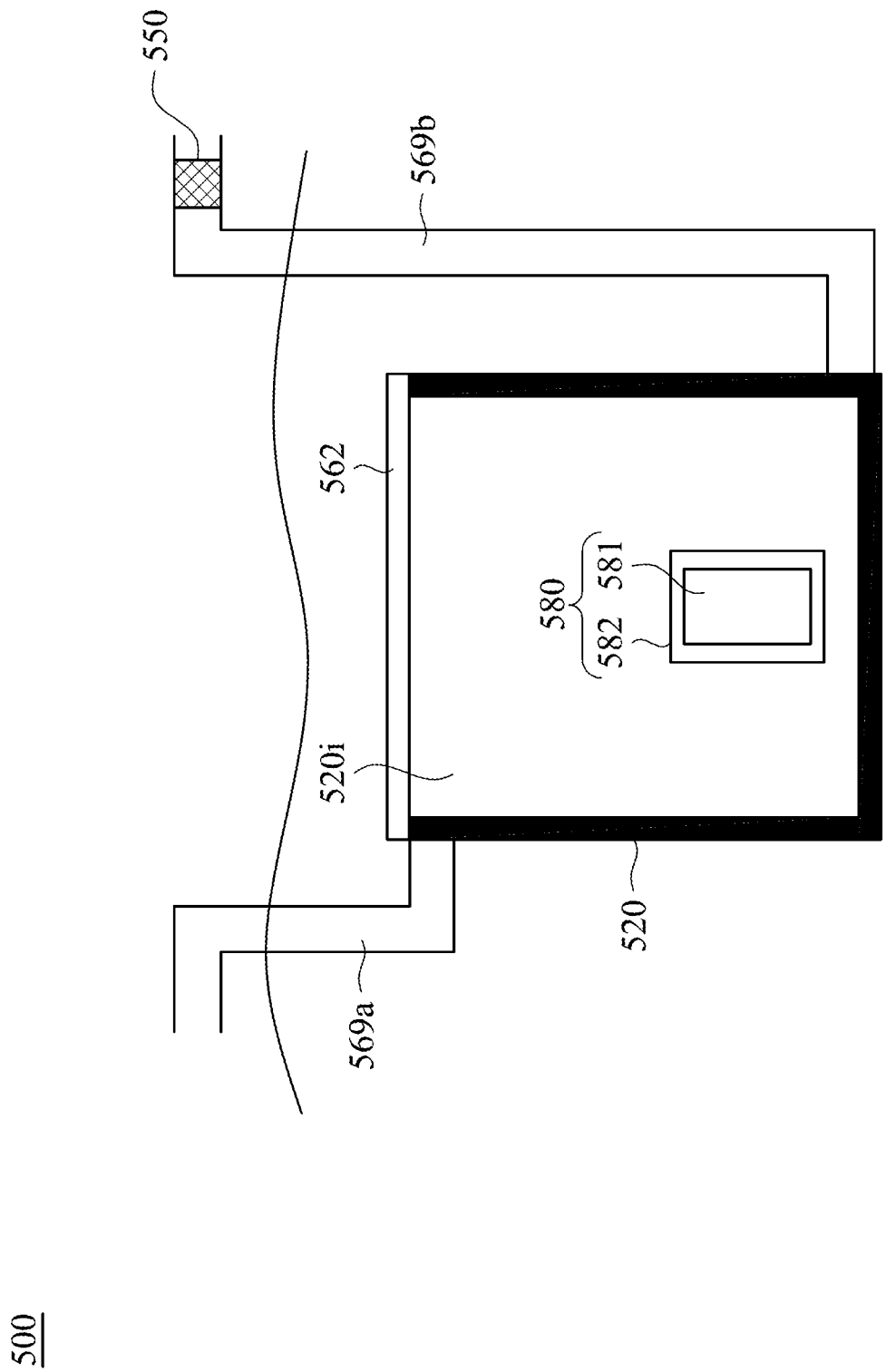
FIG. 5 illustrates a schematic view of an underwater observation device in accordance with another embodiment of the present disclosure.

FIG. 5 illustrates a schematic view of an underwater observation device in accordance with another embodiment of the present disclosure. Referring to FIG. 5, the underwater observation device 500 of the present embodiment is similar to the aforementioned underwater observation devices 100 and 200. Accordingly, the following mainly describes the differences between the underwater observation device 500 and the aforementioned underwater observation devices 100 and 200, and the same features these underwater observation devices are not repeated below.

Concretely saying, the underwater observation device 500 includes a case body 520 and a first observation assembly 580, in which the first observation assembly 580 is completely disposed inside an inner space 520i of the case body 520, and a shape of the case body 520 may be identical to the shape of the case body 120 or 220. The case body 520 includes a first transparent portion 562, and in the embodiment shown in FIG. 5, visible light may only pass through the first transparent portion 562, and may not pass through the other portions of the case body 520. In other words, under the observation of human eyes, only the first transparent portion 562 of the case body is transparent, and other portions are opaque. Therefore, when one or more objects (that is, aquatic organisms such as fish or shrimps) move to the first transparent portion 562, the first observation assembly 580 can observe the objects on the first transparent portion 562 only through the first transparent portion 562.

The first observation assembly 580 includes a video camera device 581 and a protecting cover 582, in which the protecting cover 582 covers and seals the video camera device 581. The video camera device 581 may be a visible video camera device or an infrared video camera device. The protecting cover 582 has a waterproof function, such that when the protecting cover 582 covers and seals the video camera device 581, the protecting cover 582 can prevent the water in the inner space 520i from penetrating into the video camera device 581, so as to avoid damage to the video camera device 581 resulted from the infiltrating of the water.

It is worth saying that, when the video camera device 581 is an infrared camera device, an appearance of the first transparent portion 562 may be opaque but transparent to the infrared light, that is, the first transparent portion 562 can allow infrared light to pass through and can block the visible light. As a result, under the observation of human eyes, the appearance of the entire case body 520 may be completely opaque, but for the infrared light, the first transparent portion 562 is transparent.

It is noted that, in the present embodiment, the visible light and the infrared light can only pass through the first transparent portion 562, and cannot pass through the other portions of the case body 520. However, in other embodiments, the visible light or the infrared light may also pass through the portions of the case body 520 except for the first transparent portion 562. For example, the visible light or the infrared light may pass through a bottom surface or side surfaces of the case body 520 in FIG. 5. Alternatively, for the visible light or the infrared light, the entire case body 520 may also be transparent. Therefore, the case body 520 is not restricted to make the visible light or the infrared light pass only through the first transparent portion 562, that is, at least one portion of the case body 520 other than the first transparent portion 562 may also transmit the visible light or the infrared light.

The underwater observation device 500 may further include a tube 569a and a tube 569b, in which both the tube 539a and the tube 539b are connected to the case body 520 and are communicated with the inner space 520i of the case body 520. When the case body 520 enters the water, gas (such as air) in the inner space 520i may be discharged to an outside of the case body 520 through the tube 569a and the tube 569b. Next, a water pumping device (not shown) may be connected to the tube 569b, such that the limpid water provided by the water pumping device can enter the inner space 520i from the tube 569b when the case body 520 is immersed in the water, thereby helping the case body 520 be immersed in the water smoothly. The water may be drawn through the tube 569b when the case body 520 exits the water.

Moreover, a first filtering portion of the underwater observation device 500 may include a filtering material 550, which may be disposed inside the tube 569b, and adjacent to an end of the tube 569b not connected to the case body 520 as shown in FIG. 5, such that the filtering material 550 and the tube 569b can be integrated into a single first filtering portion, in which the tube 569b is configured to fix the filtering material 550 on the case body 520, such that the tube 569b may have the same function like the fixing member 240c, that is, the tube 569b is equivalent to the fixing member. Furthermore, in other embodiments, the tube 569a may also be configured to fix the filtering material 550 on the case body 520, so the tube 569a may have the same function as the fixing member 240c, and the tube 569a is equivalent to the fixing member.

In some embodiments, the limpid gas (such as air) may also be injected into the case body 520 through the tube 569a and the tube 569b, so as to provide a clear underwater observation effect, and reduce a risk of water immersion of the video camera device in the case body. However, due to the buoyance of the gas, counterweights (not shown) may be needed to be disposed inside the case body 520 or outside the case body 520, so as to assist the case body 520 to enter the water.

Figure 6:
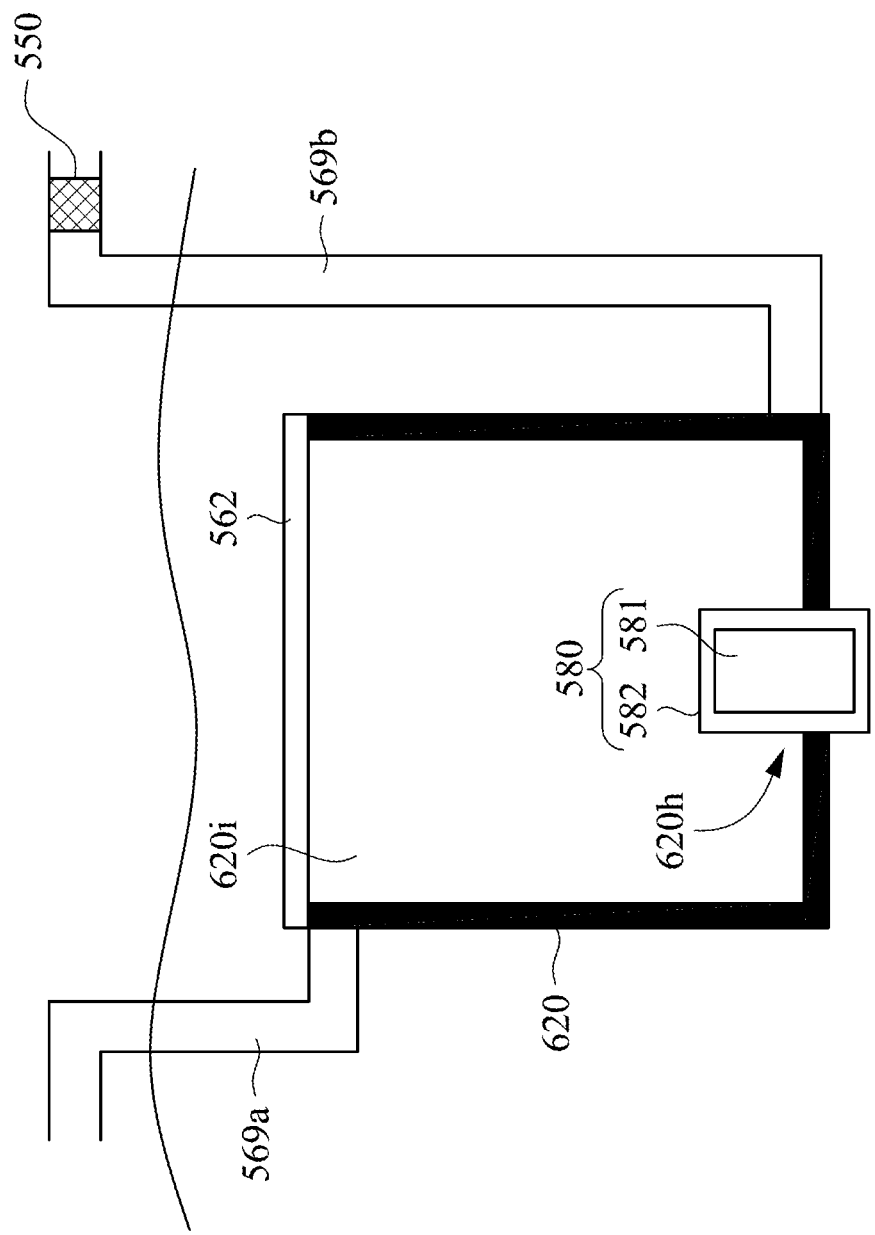
FIG. 6 illustrates a schematic view of an underwater observation device in accordance with another embodiment of the present disclosure.

FIG. 6 illustrates a schematic view of an underwater observation device in accordance with another embodiment of the present disclosure. Referring to FIG. 6, the underwater observation device 600 of the present embodiment is similar to the aforementioned underwater observation device 500. Accordingly, the following mainly describes the differences between the underwater observation devices 600 and 500, and the same features these underwater observation devices are not repeated below.

Different from the aforementioned underwater observation device 500, in the underwater observation device 600, a case body 620 has a mounting hole 620h and an inner space 620i, in which the mounting hole 620h is communicated with the inner space 620i, and the mounting hole 620h is a through hole. Therefore, the inner space 620i may be communicated with the outside through the mounting hole 620h. The underwater observation device 600 also includes a first observation assembly 580, in which the first observation assembly 580 is inserted into the mounting hole 620h, and a portion of the first observation assembly 580 is in the inner space 620i. In other words, the first observation assembly 580 may be partly located in the case body 620.

With the underwater observation device of embodiments of the present disclosure, when the observation is conducted in the waters containing impurities, such as contaminants or biological excreta, especially in the waters of an aquaculture farm, the filtering portion may be used to filter the water entering the case body to form a more clear environment in the case body, which is advantageous for the observation.

Figure 7:
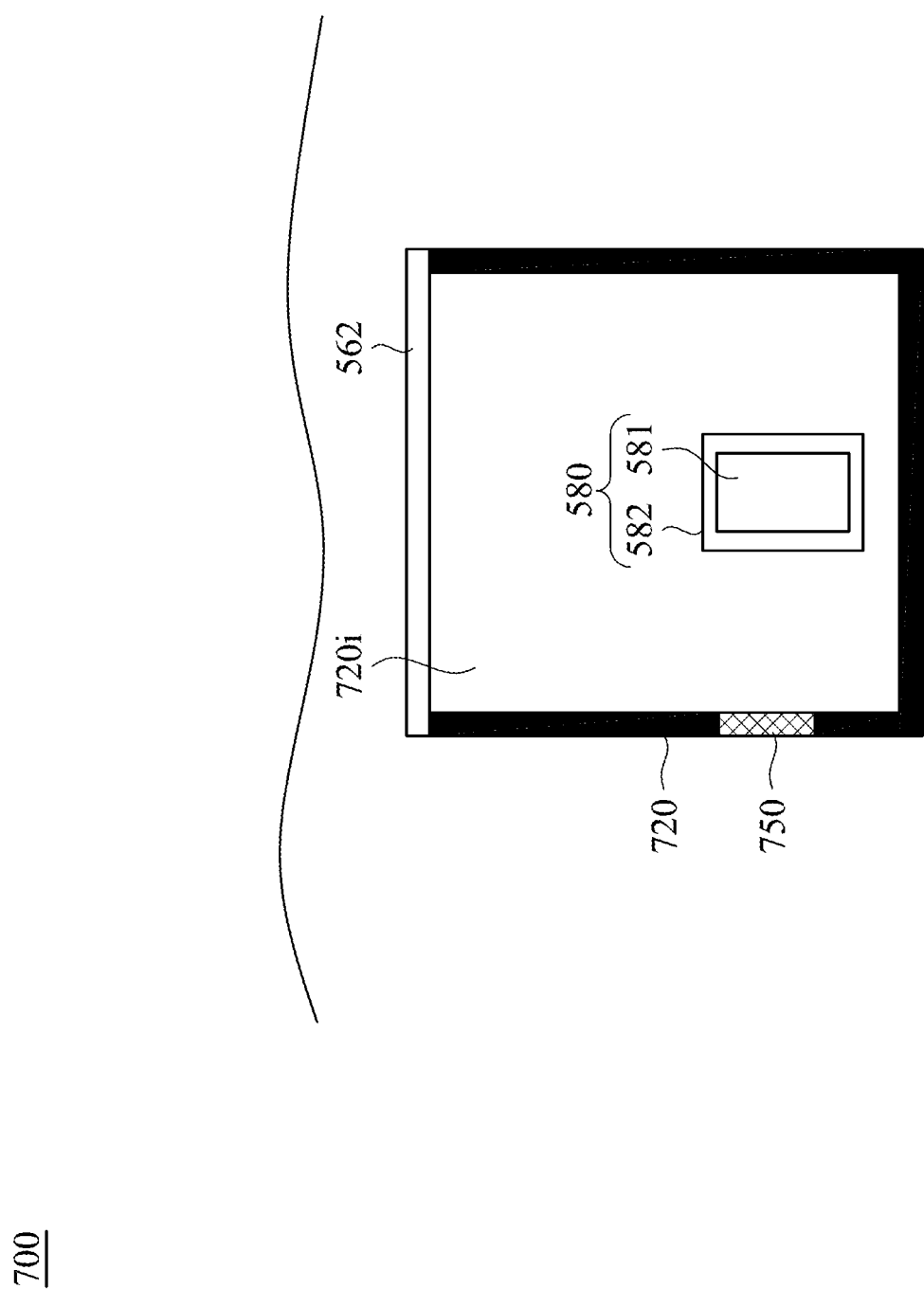
FIG. 7 illustrates a schematic view of an underwater observation device in accordance with another embodiment of the present disclosure.

FIG. 7 illustrates a schematic view of an underwater observation device in accordance with another embodiment of the present disclosure. Referring to FIG. 7, the underwater observation device 700 of the present embodiment is similar to the aforementioned embodiments, in which a case body 720 of the underwater observation device 700 also includes a first transparent portion 562, and the first observation component 580 can observe the object on the first transparent portion 562 through the first transparent portion 562. The following only describes the differences between the underwater observation device 700 and the aforementioned embodiments, and the same features are not repeated herein.

Different from the aforementioned underwater observation devices 500 and 600, the underwater observation device 700 may not have any tubes 569a and 569b, in which a first filtering portion 750 included in the underwater observation device 700 may be disposed on the case body 720, and the first filtering portion 750 may be disposed on other portions of the case body 720 except for the first transparent portion 562. For example, the first filtering portion 750 may be connected to a sidewall or a bottom of the case body 720. Take the FIG. 7 as an example, the first filtering portion 750 may be embedded in the sidewall of the case body 720, and may filter the fluid (such as water) entering an inner space 720i. Furthermore, in the other embodiments, the first filtering portion 750 may also be disposed on the first transparent portion 562. Next, the underwater observation device 700 may also include the tube 569a and the tube 569b. Therefore, a design of the underwater observation device 700 is not limited to FIG. 7.

In summary, one advantage of the present disclosure is that the underwater observation device of the present disclosure is equipped with a filtering portion capable of filtering out impurities in the water entering the case body when the case body enters the water by different filtering mechanisms such that a more clear environment is formed in the case body, thereby improving the observation quality and the photography conditions.

Another advantage of the present disclosure is that the underwater observation device of the present disclosure uses additional holes and/or tubes to exhaust the gas in the case body more smoothly when the case body enters the water, such that the sinking speed of the case body to enter the water is increased so as to conduct the observation easily and rapidly. Furthermore, these tubes are helpful to fill the case body with clear water, transparent gas, or both of them based on the requirements of on-site construction operation, so as to provide a clear observation quality and a good photograph condition.

Still another advantage of the present disclosure is that the underwater observation device of the present disclosure uses an induction device to attract the objects to be observed such that users and/or observation assemblies may easily focus on the objects for observation, thereby increasing the efficiency of the observation.

The embodiments of the present disclosure have been disclosed as above with examples, but are not intended to limit the present disclosure. Those skilled in the art can make various modifications, substitutions, and variations without departing from the spirit and scope of the present disclosure. Therefore, the protection scope of the present disclosure should be subject to the appended claims.

What is claimed is:

1. An underwater observation device, comprising:
   a case body having an inner space, and comprising:
      a first transparent portion located on a side of the case body, wherein the first transparent portion is formed of a transparent material, at least one object is suitable to be located on the first transparent portion;
      a first filtering portion disposed on the case body and configured to filter a plurality of impurities in a fluid entering the inner space of the case body; and
      a first observation assembly configured to observe the at least one object on the first transparent portion through the first transparent portion and the fluid, which passes through the first filtering portion and enters the inner space of the case body.

2. The underwater observation device of claim 1, wherein the case body further comprises a second transparent portion formed of the transparent material, the first transparent portion and the second transparent portion are adjacent to the first filtering portion and are respectively located on two opposite sides of the case body, wherein the first transparent portion and the second transparent portion are configured for a user to observe the at least one object through the case body.

3. The underwater observation device of claim 1, wherein the case body is a cylinder or a hexahedron.

4. The underwater observation device of claim 1, further comprising at least one hole passing through the case body and configured for the fluid to enter and exit the case body.

5. The underwater observation device of claim 4, further comprising at least one tube, wherein the tube is connected to the case body through the at least one hole.

6. The underwater observation device of claim 5, wherein a number of the at least one tube is two, the tubes are connected to the case body, and the first filtering portion is disposed in one of the tubes.

7. The underwater observation device of claim 2, wherein the first observation assembly is disposed on the second transparent portion and configured to observe the at least one object on the first transparent portion through the second transparent portion, the fluid passing through the first filtering portion and entering the inner space of the case body, and the first transparent portion, wherein the first observation assembly is connected to the second transparent portion and located outside the inner space.

8. The underwater observation device of claim 1, further comprising an induction assembly disposed on the first transparent portion, and the induction assembly being configured to attract the at least one object.

9. The underwater observation device of claim 1, wherein the first filtering portion comprises a fixing assembly and a filtering material, and the fixing assembly is configured to fix the filtering material to the case body.

10. The underwater observation device of claim 1, wherein the first filtering portion comprises an accommodation space configured to accommodate a filtering material.

11. The underwater observation device of claim 1, wherein the first observation assembly is disposed in the inner space.

12. The underwater observation device of claim 1, wherein the case body has a mounting hole, the mounting hole is communicated with the inner space, and the first observation assembly is inserted in the mounting hole, and a portion of the first observation assembly is located in the inner space.

13. The underwater observation device of claim 12, wherein the first filtering portion comprises:
   a video camera device; and
   a protecting cover covering and sealing the video camera device.

14. The underwater observation device of claim 13, wherein the video camera device is an infrared video camera device, and an infrared light is able to pass through the first transparent portion.

* * * * *